Feb. 5, 1963 B. F. TYSON 3,076,869

COLOR TELEVISION DISPLAY INDEXING SYSTEM

Filed May 26, 1959 3 Sheets-Sheet 1

INVENTOR
BENJAMIN F. TYSON
BY Theodore Jay Jr.
ATTORNEY

Feb. 5, 1963 B. F. TYSON 3,076,869

COLOR TELEVISION DISPLAY INDEXING SYSTEM

Filed May 26, 1959 3 Sheets-Sheet 2

INVENTOR
BENJAMIN F. TYSON
BY Theodore Jay Jr.
ATTORNEY

INVENTOR
BENJAMIN F. TYSON
BY Theodore Jay Jr.
ATTORNEY

United States Patent Office 3,076,869
Patented Feb. 5, 1963

3,076,869

COLOR TELEVISION DISPLAY INDEXING SYSTEM

Benjamin F. Tyson, Douglaston, N.Y., assignor to Sylvania Electric Products Inc., a corporation of Delaware Filed May 26, 1959, Ser. No. 815,873
8 Claims. (Cl. 178—5.4)

My invention is directed toward television receivers and cathode ray tube registration systems for use therein.

This application is a continuation in part of my copending application Serial No. 516,668 filed June 20, 1955, now abandoned.

One type of cathode ray tube adapted for use in color television receivers is provided with an image forming screen having a plurality of parallel stripes, usually vertical stripes, of luminescent material. These stripes are normally arranged in laterally displaced color triplets, each triplet being composed of three phosphor stripes which respond to electron bombardment to produce light of the different primary colors. The stripes are normally scanned horizontally by an electron beam which is intensity modulated in accordance with an incoming demodulated video signal carrying three signal components, each one representing one of the primary colors. These components are amplitude modulated on a common carrier of fixed frequency and are displaced in phase with respect to each other. In order to obtain accurate color rendition, at the instant the beam strikes any particular color stripe, it must be intensity modulated by the corresponding color signal component and no other. This action can be accomplished quite readily through sequentially sampling each color component in turn, if the scanning velocity is held constant and equal to that established by the indexing frequency. However, the scanning velocity is normally not constant, due in part to non-linearities in the beam deflection circuits, and, for example, non-uniformities in the color triplet distribution on the screen surface. Consequently, the simple arrangement described above is unacceptable.

It has been proposed to place a plurality of indexing stripes at equidistantly spaced intervals on the screen. These indexing stripes may coincide with a particular color stripe in each triplet, or can be immediately adjacent each triplet; however, these stripes are composed of a material having secondary emission properties which differ from the secondary emissive properties of the color stripes. Thus, when a horizontal raster is scanned, the resultant secondary emission from the indexing stripes provides a source of indexing signals which are pulse-like in nature and which are indicative of the instantaneous position of the electron beam upon the screen. The recurrence frequency of these indexing signals is defined as the indexing frequency. These signals could then be used to control the beam scanning circuits in such manner that the velocity of scan is held constant.

This proposed arrangement suffers from a number of serious disadvantages. In the first place, the horizontal deflection generator necessarily provided in the horizontal scanning circuit must be extremely complex, expensive and inefficient. Moreover, even the best horizontal deflection generators of this type permit some variations in the scanning velocity and, as a result, the color rendition is impaired. Moreover, the corrective action initiated by the indexing signal is relatively slow, being subject to inherent frequency dependent delays in signal transmission, and when the scanning velocity is varied at a rapid rate, the corrective action is delayed in the manner indicated, and again the color rendition is impaired.

Accordingly, it is an object of the present invention to improve the color rendition properties of color television receiver systems.

A further object is to provide a new and improved color cathode ray tube registration system for use in color television receivers.

Still another object is to provide a new and improved color cathode ray tube registration system which obtains very accurate color rendition, yet makes use of conventional horizontal deflection generators and associated deflection circuitry.

These and other objects of my invention will either be explained or will become apparent hereinafter.

I have discovered that it is not necessary to provide a constant scanning velocity in systems of the character indicated. When the scanning velocity is constant, the indexing signal has a pulse train component of constant recurrence frequency; i.e. the pulses forming the pulse train are equally separated in time. However, when this varies, the pulses no longer exhibit equal time separations, the time spacing between pulses being varied in accordance with the velocity variations. In other words, the recurrence frequency or instantaneous phase of the indexing pulses varies in accordance with the variations in scanning velocity. If now the phase of the demodulated video signal carrier, which as indicated previously is at indexing frequency, remains fixed, the color components modulated on this carrier intensity modulate the electron beam in improper phase relation with respect to the indexing signal, and an intolerable error in color rendition results.

In contradistinction, I permit the scanning velocity to vary, but shift the phase of the video signal carrier in like amount but in opposite sense with respect to the phase variations in the indexing signal. As a result, the modulation components are always supplied to the control grid in proper phase relation with the indexing signal, and variations in scanning velocity cannot produce appreciable errors in color rendition.

An illustrative embodiment of my invention will be found in the accompanying drawings wherein.

Figure 1:
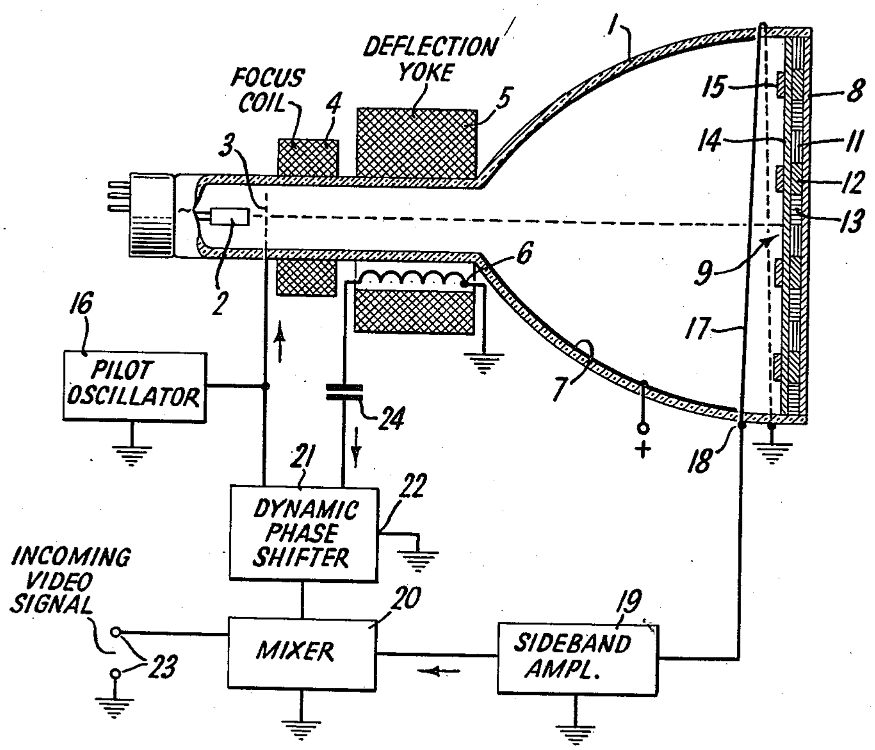
FIG. 1 illustrates in block form a highly simplified illustration of an embodiment of my invention.

Referring now to FIG. 1, there is provided a conventional cathode ray tube identified generally at 1 and provided with an electron gun assembly 2 for producing an electron beam, a control grid 3 for said beam, a beam focus coil 4, and a beam deflection yoke 5. Deflection yoke 5 is connected to conventional beam deflection circuits (not shown) which exhibit an inherent variation in scanning velocity, for example, on the order of ±5% about the nominal scanning velocity. In addition, mounted within yoke 5 is a search coil 6 inductively coupled to the yoke.

Figure 2:
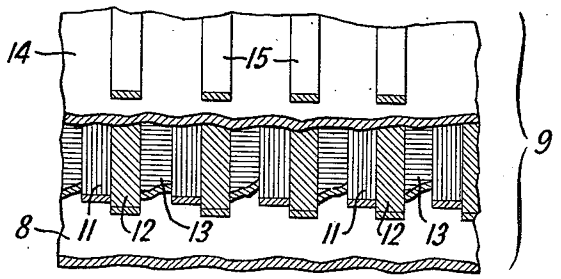
FIG. 2 is a cross sectional view partially cut away showing a portion of the image forming screen for the cathode ray tube shown in FIG. 1.

The inner wall of the cone portion of tube 1 is coated with a conductive coating 7 connected in conventional manner to a point of high positive potential. This coating terminates at a point spaced from the face plate 8. Face plate 8 is provided with an image forming screen 9 as shown in more detail in FIG. 2 where a portion of the structure is shown as viewed from the interior of the tube. Screen 9 includes a plurality of laterally displaced color triplets, each triplet being composed of phosphor stripes 11, 12 and 13 which, when bombarded by the electron beam, fluoresce to produce light of the three primary colors, for example, red, green and blue respectively. These stripes are covered with a layer 14 of aluminum or similar material. Arranged over each green stripe 12 is an indexing stripe 15 consisting of material having a secondary emission characteristic detectably different from the material of layer 14.

An oscillator 16, producing oscillations at a fixed frequency defined as the pilot frequency, is coupled to the control grid 3.

Interposed between the coating 7 and the face plate 8 in the inner wall of the tube is a signal pick-off loop 17 consisting, for example, of a ring-shaped conductive coating or a coil loop inductively coupled to the tube. The output terminal 18 of the loop is coupled to a side band amplifier 19. The output of this amplifier is coupled to a first input of mixer 20. The output of mixer 20 is coupled to the input of a dynamic phase shifter 21. The output of the phase shifter 21 is coupled to control grid 3 of tube 1. The search coil 6 is connected to the phase shift control input 22 of the phase shifter 21.

When a video signal appears on the control grid 3, the cathode ray impinges successively on the coating 14 and the indexing stripes 15. The beam is varied in intensity in accordance both with the video signal and the signal from the oscillator 16. However, the amplitude of the signal supplied from oscillator 16 is much less than that of the video signal, so that the video image displayed on the face of the tube is unaffected by these oscillations.

During any horizontal scanning operation, as a result of beam travel, an indexing signal made up of a component at the pilot frequency and side band frequency components respresenting the sum and difference frequencies of the pilot frequency and the indexing frequency (that is, the rate at which the indexing stripes are scanned by the cathode ray beam) is induced in the pick-off loop 17. The side band amplifier 19 extracts from this indexing signal the upper side band component representing indexing frequencies. As a result, the signal yielded at the output of the side band amplifier 19 is a substantially unmodulated signal having this upper side band (indexing) frequency. This substantially unmodulated signal is mixed with the incoming video signal to produce a difference signal at the output of the mixer which is at indexing frequency and retains the original modulation components of the video signal.

When the scanning velocity remains constant (and consequently the indexing velocity remains constant) the waveform of the current flowing through the deflection yoke has the shape of a sawtooth, and the rate of change of current flow in the yoke is constant. Under these conditions a constant voltage is induced across the search coil. Since this voltage is constant, capacitor 24 acts as a blocking capacitor to prevent the constant voltage from being supplied to the dynamic phase shifter 21.

When the scanning or indexing velocity varies about its nominal value, the sawtooth waveform is distorted, and the time rate of change of current flow is no longer constant. As a result, a control voltage is induced across the search coil which is proportional to the difference between the actual scanning velocity and the nominal scanning velocity, and hence is proportional to the instantaneous phase shift of the indexing pulses, the direction of phase shift (either leading or lagging) being indicated by the instantaneous polarity (either positive or negative) of the voltage induced across the search coil. This voltage is supplied through capacitor 24 to the phase control input of the phase shifter to shift the phase of the modulated carrier at indexing frequency appearing at the output of the mixer in an amount equal to the phase shift represented by the change in indexing velocity and in opposite direction thereto. As a result, the video signals are supplied to the control grid in proper phase relation with respect to variations in scanning velocity and no appreciable errors in color rendition can result.

It will be apparent that the dynamic phase shifter need not be positioned as shown but, for example, can be interposed between the side band amplifier and the first input to the mixer, or could be interposed between the incoming video signal and the mixer. The same results will be obtained in each case.

The tube described above is of known type and is described, for example, in U.S. Patent No. 2,673,890. A dynamic phase shifter capable of use in the manner indicated is described in U.S. Patent No. 2,753,519 and further details on this shifter will be found therein.

Figure 3:
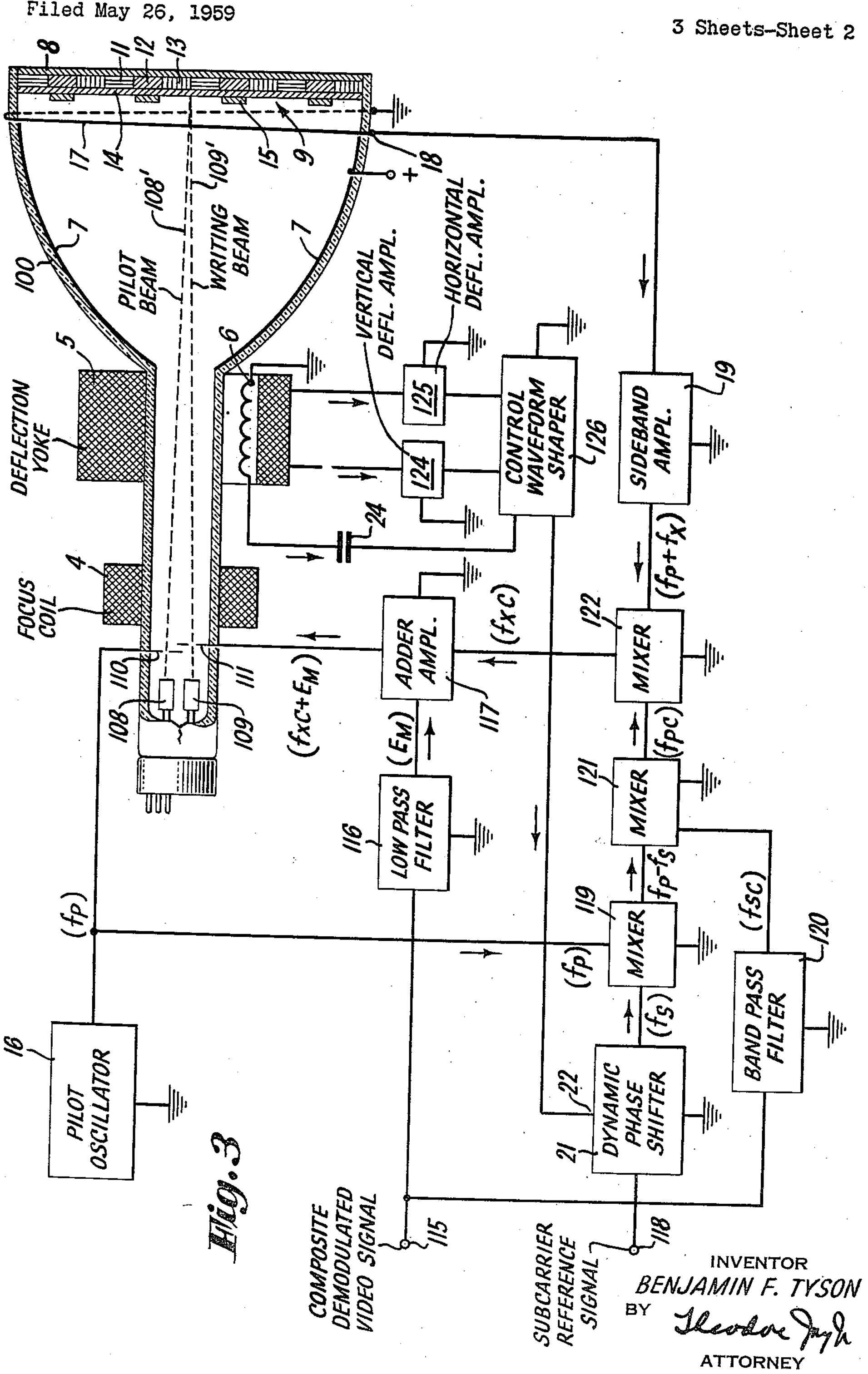
FIG. 3 illustrates in block form a color cathode ray tube registration system embodying in detail certain features of my invention.

The circuit described in FIG. 1 has been greatly simplified in order to explain more readily certain basic aspects of my invention. In FIG. 3, a cathode ray tube display system illustrates these and other features of my invention in more detail. A cathode ray tube identified at 100 is of the same general known type shown in FIG. 1. However, the tube is provided with two electron guns 108 and 109 which produce corresponding electron beams defined as a pilot beam and a writing beam. The writing beam is used to produce the desired color video display; the pilot beam is used to produce the indexing signal. Both beams are simultaneously deflected across the face of the tube and scan the same indexing stripes at the same time. Control grids 110 and 111 are used to control the intensities of the pilot beam and the writing beam respectively. The use of dual beams prevents undesirable video signal-indexing signal intermodulation and permits easier separation and detection of the indexing signal.

A conventional incoming composite demodulated video signal, containing both monochrome and color information, appears at terminal 115 and is supplied to low pass filter 116. Filter 116 passes only the low frequency components $E_M$ (the monochrome video information) of the video signal. This monochrome $E_M$ is supplied to a first input of adder amplifier 117.

A sub-carrier reference signal generated by a local oscillator (not shown), which is synchronized in conventional manner by the transmitted color synchronizing burst, appears at terminal 118 and is supplied through dynamic phase shifter 21 to the input of mixer 119.

The composite video signal is also supplied from terminal 115 to a band pass filter 120. Filter 120 passes only the modulated color subcarrier (the chromaticity information) of the video signal. This modulated subcarrier is supplied to an input of mixer 121. A pilot oscillator 16 of fixed frequency substantially higher than that of the frequency of the subcarrier reference signal supplies a signal to the pilot beam control grid 110 and also supplies a signal to a second input of mixer 119. The output of mixer 119 is fed to a second input of mixer 121. The output of mixer 121 is fed into an input of mixer 122. The signal from the pick-up loop 17 is supplied through side band amplifier 19 to another input of mixer 122; the output of mixer 122 is supplied to a second input of the adder amplifier. The output of the adder amplifier is connected to the writing beam control grid 111. Vertical and horizontal deflection amplifiers 124 and 125 supply deflection power to the yoke 5 in conventional manner and also supply voltages proportional to the deflection power to the input of the control waveform shaper 126. The control voltage developed across the search coil 6 is also supplied in the same manner as in FIG. 1 to the input of this shaper. The output of the shaper is supplied to the phase control input 22 of the dynamic phase shifter 21.

This system operates in the following manner:

The pilot beam is modulated by a signal from the pilot oscillator at a selected carrier frequency $f_p$ which, for example, can be on the order of 40 mc./sec. As the pilot beam sweeps across the indexing stripes, secondary emission current is produced which is collected by the aquadag coating on the inside of the tube. This current flow varies in magnitude as the beam sweeps across the tube, having a maximum value when crossing an indexing stripe and having a minimum value when crossing the intervening spaces. In essence, this current flow consists of pulses of pilot carrier current, the pulse recurrence or indexing frequency $f_x$ being determined by the number of indexing stripes and the velocity at which the beam crosses these stripes. By virtue of this current flow, a signal proportional thereto is induced in the pick-up loop. This proportional signal contains frequency components which include the pilot carrier frequency $f_p$ plus the upper and lower sidebands formed representing the sum and difference frequency beats between the frequency $f_p$ and the frequency $f_x$ The first upper sideband $(f_p+f_x)$ is selected and amplified in the sideband amplifier 19. The pilot oscillator signal $f_p$ is also fed into mixer 119 where it mixes or beats with another signal $f_s$ leaving the dynamic phase shifter.

Signal $f_s$ is the locally generated color subcarrier reference signal shifted in phase by the dynamic phase shifter in a manner described in more detail below. The difference frequency beat signal $(f_p-f_s)$ is supplied to the input of mixer 121 where it is mixed or beat with the signal $f_{sc}$ leaving the band pass filter. This signal $f_{sc}$ represents the phase and amplitude modulated color subcarrier which has been separated from the remaining portion of the composite color video signal through action of the band pass filter 120. Due to the mixer action, the signal $f_{pc}$ leaving the mixer is at pilot carrier frequency but now carries the same phase and amplitude modulation present on the color subcarrier $f_{sc}$. Signal $f_{pc}$ and the side band signal $(f_p+f_x)$ from the side band amplifier are fed into mixer 122 to produce a difference frequency beat signal designated as $f_{xc}$. This signal is at indexing frequency, but is now amplitude and phase modulated in accordance with the transmitted color information. This signal together with the monochrome video information yielded by the low pass filter 116 is supplied to the adder amplifier 117 wherein both signals are added together and amplified. This amplified composite signal is then supplied to control grid 111 to control the intensity of the writing beam.

As indicated previously the scanning velocity is not uniform, but varies as much as ±5% about the nominal scanning velocity. However, as the phase of the indexing signal $f_x$ varies due to the variations in scanning velocity, the phase of the subcarrier reference signal $f_s$ appearing at the output of the phase shifter, through action of the control signal supplied by the shaper 126, is made to shift corresponding amounts but in the opposite sense and hence causes the writing signal $f_{xc}$ to remain in proper phase correspondence with the color phosphor stripes.

It will be seen that the control voltage induced in the search coil in FIG. 1 is supplied directly to the phase shifter, while in FIG. 3 the voltage from the search coil is first combined with voltages from the horizontal and vertical deflection amplifiers, and the combined voltage is shaped in the control waveform shaper before being supplied to the phase shifter. The horizontal and vertical deflection voltages are handled in this manner to provide an additional phase correction.

More particularly, the voltage from the search coil only corrects errors developed during the scanning of any line when the actual scanning velocity for this line differs from the nominal scanning velocity of the line.

However, cathode ray tubes are subject to miniscus distortion; when appropriate corrections are made for such distortion, the normal horizontal scanning velocity does not remain the same for all lines, but rather varies from line to line. This variation will produce an additional error in color rendition which cannot be corrected by the voltage from the search coil, but rather requires the use of the horizontal and vertical deflection voltages as well.

Further, because of the curvature of the tube face, the time required for the secondarily emitted electrons (produced when the electron beam strikes any indexing strip) to pass through the pick up loop and generate the indexing pulses, varies from point to point along any horizontal line and further varies from line to line. This variation in transit time also produces an additional error in color rendition which cannot be corrected without the use of horizontal and vertical deflection voltages.

Thus, in order to provide complete correction, the control voltage supplied to the dynamic phase shifter must be derived from voltages yielded by both deflection circuits as well as the search coil.

The control waveform shaper produces the control voltage by summing voltages derived from the deflection circuits and the search coil, although the relative amplitudes of the various voltages supplied to the input of the shaper may be adjusted by means of potentiometers and the like.

Figure 4:
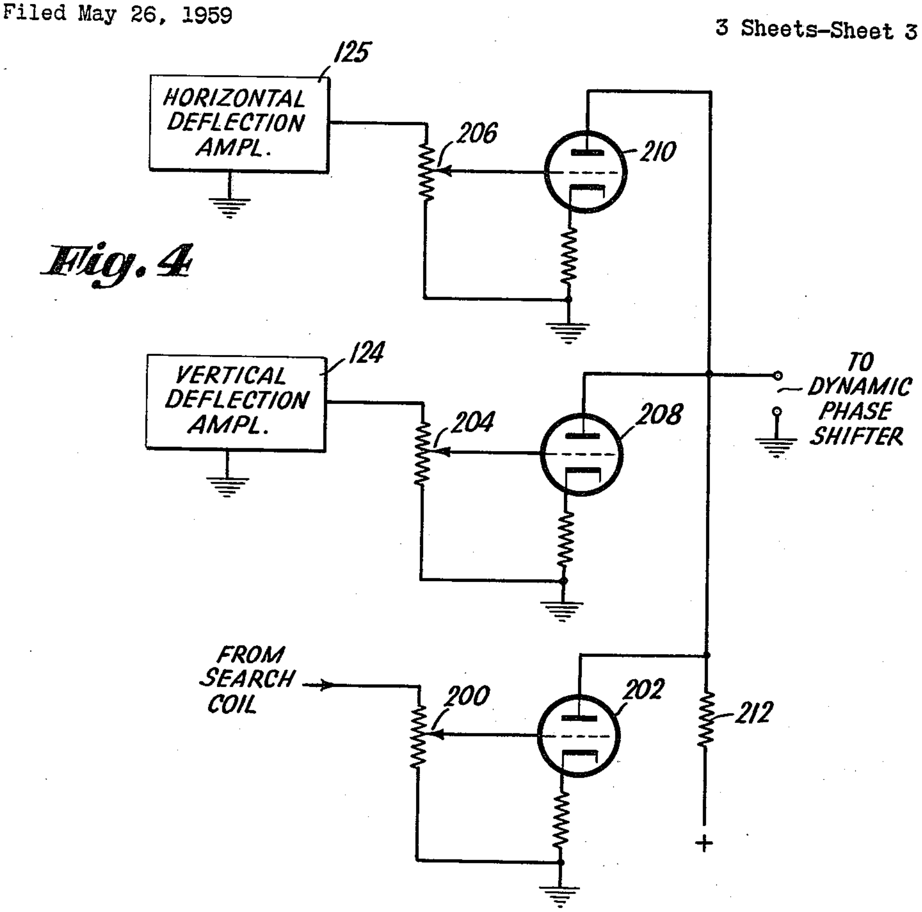
FIG. 4 is a schematic diagram of the control waveform shaper shown in FIG. 3.

A schematic diagram of the control waveform shaper is shown in FIG. 4. The voltage from the search coil 6 is supplied through potentiometer 200 to the input of triode 202. Similarly, the voltages from the vertical deflection amplifier 124 and the horizontal deflection amplifier 125 are respectively supplied through potentiometers 204 and 206 to the respective inputs of triodes 208 and 210. The outputs of triodes 202, 208 and 210 are tied together to a common load resistor 212. The signal appearing across resistor 212 and thereafter supplied as a control voltage to the dynamic phase shifter is proportional to the summation of the voltages supplied to the inputs of triodes 202, 208 and 212.

Figure 5:
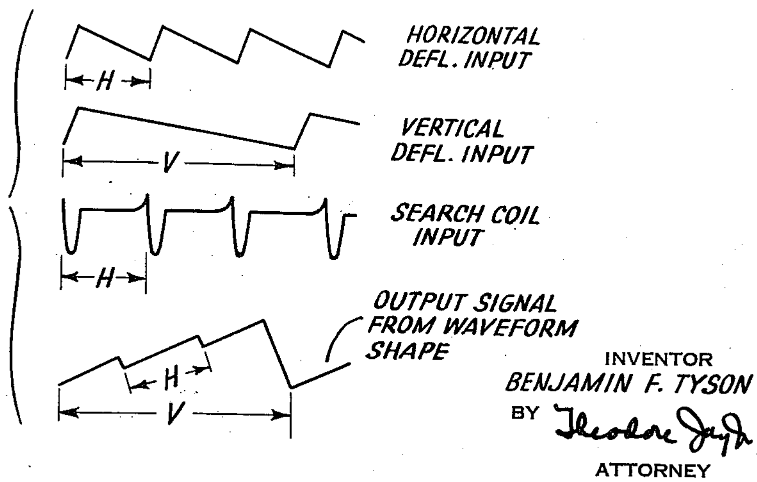
FIG. 5 illustrates typical waveforms of signals utilized in the waveform shaper of FIG. 4.

Typical waveforms of the various signals utilized and developed in the control waveform shaper are shown in FIG. 5. It should be noted that these waveforms will vary depending upon the types of tubes and deflection circuits actually used. Further, appropriate adjustment of relative amplitudes of the various input voltages is required for each tube type and, often, for different tubes of the same type.

It will be apparent that the phase shifter need not be positioned as shown in FIG. 3, but instead can be positioned in any of the channels carrying the signals identified as $f_p$, $(f_p+f_x)$, $(f_p-f_s)$, $f_{sc}$, $f_{pc}$, or $f_{xc}$.

What is claimed is:

1. In combination with a source of video signals and a cathode ray tube wherein an electron beam positionally controlled from a deflection circuit successively scans horizontally a plurality of vertical, parallel, laterally separated indexing stripes to produce secondary emission current pulses at an indexing recurrence frequency, the actual scanning velocity established by the deflection circuit inherently varying about a nominal fixed value whereby the instantaneous phase of said pulses varies accordingly, the beam intensity being controlled from a grid circuit, a pilot oscillator coupled to said grid circuit to modulate said beam intensity at a fixed pilot frequency whereby an indexing signal constituted by said pulses modulated on a first carrier at said pilot frequency is produced, the upper and lower sidebands of said first carrier respectively representing the sum and difference of said pilot and indexing frequencies, a circuit comprising first means responsive to said indexing signal to derive therefrom a single sideband signal at said indexing frequency; second means coupled to said deflection circuit to derive therefrom a control voltage, the magnitude of said voltage increasing with increasing difference between said nominal and actual velocities and being zero when said two velocities are equal, said voltage having one polarity when the actual velocity is larger than said nominal velocity and having opposite polarity when the nominal velocity is larger than the actual velocity; and phase shifting and mixing circuit means coupled at its input to said source and said first and second means to derive from said video signals, said sideband signal and said control voltage, an output signal constituted by said video signals modulated on a second carrier at said indexing frequency, the phase of said second carrier being shifted in like amount but in opposite direction to said instantaneous phase variations, said output signal being supplied to said grid circuit.

2. The combination as set forth in claim 1, wherein said single sideband signal is an upper sideband signal.

3. The combination as set forth in claim 1, wherein said single sideband signal is a lower sideband signal.

4. In combination with a source of video signals and a cathode ray tube wherein an electron beam positionally controlled from a deflection circuit successively scans horizontally a plurality of vertical, parallel, laterally separated indexing stripes to produce secondary emission current pulses at an indexing recurrence frequency, the actual scanning velocity established by the deflection circuit inherently varying about a nominal fixed value whereby the instantaneous phase of said pulses varies accordingly, the beam intensity being controlled from a grid circuit, a pilot oscillator coupled to said grid circuit to modulate said beam intensity at a fixed pilot frequency whereby an indexing signal constituted by said pulses modulated on a first carrier at said pilot frequency is produced, the upper and lower sidebands of said first carrier respectively representing the sum and difference of said pilot and indexing frequencies, a circuit comprising first means responsive to said indexing signal to derive therefrom a single sideband signal at said indexing frequency; second means coupled to said deflection circuit to derive therefrom a control voltage, the magnitude of said voltage increasing with increasing difference between said nominal and actual velocities and being zero when said two velocities are equal, said voltage having one polarity when the actual velocity is larger than said nominal velocity and having opposite polarity when the nominal velocity is larger than the actual velocity; third means responsive to said video signal and said sideband signal to derive therefrom a heterodyned signal constituted by said video signals modulated on a second carrier at said indexing frequency; and fourth means including a phase shifter and responsive to said heterodyned signal and said control voltage to produce an output signal constituted by said video signals modulated on a phase shifted carrier at said indexing frequency, the phase shift being in like amount but in opposite direction to said instantaneous phase variations, said output signal being supplied to said grid circuit.

5. The combination as set forth in claim 4, wherein said deflection circuit includes a deflection yoke and wherein said second means includes a search coil inductively coupled said yoke.

6. In combination with a source of video signals and a cathode ray tube wherein first and second beams positionally controlled from a common deflection circuit successively scan horizontally and in synchronism a plurality of vertical, parallel, laterally separated indexing stripes to produce secondary emission current pulses at an indexing recurrence frequency, the actual scanning velocity established by the deflection circuit inherently varying about a nominal fixed value whereby the instantaneous phase of said pulses varies accordingly, the beam intensities being respectively controlled from first and second grid circuits; a pilot oscillator coupled to said first grid circuit to modulate the intensity of said first beam at a fixed pilot frequency whereby an indexing signal constituted by said pulses modulated on a first carrier at said pilot frequency is produced, the upper and lower sidebands of said first carrier respectively representing the sum and difference of said pilot and indexing frequencies, a circuit comprising first means responsive to said indexing signal to derive therefrom a single sideband signal at said indexing frequency; second means coupled to said deflection circuit to derive therefrom a control voltage, the magnitude of said voltage increasing with increasing difference between said nominal and actual velocities and being zero when said two velocities are equal, said voltage having one polarity when the actual velocity is larger than said nominal velocity and having opposite polarity when the nominal velocity is larger than the actual velocity; and phase shifting and mixing apparatus coupled at its input to said source and said first and second means to derive from said video signals, said sideband signal and said control voltage, an output signal constituted by said video signals modulated on a second carrier at said indexing frequency, the phase of said second carrier being shifted in like amount but in opposite direction to said instantaneous phase variations, said output signal being supplied to said second grid circuit.

7. The combination as set forth in claim 6 further including an adder provided with first and second input circuits and an output circuit, said adder being interposed between said apparatus and the second grid circuit, the first input circuit being coupled to the output of said apparatus, the output circuit being coupled to said second grid circuit; and means to supply an additional signal carrying television monochrome information to the second adder input circuit whereby the output circuit of said adder yields an additional composite signal containing both monochrome and chromaticity information, said additional composite signal being supplied to the second grid.

8. In combination with a source of video signals and a cathode ray tube wherein an electron beam positionally controlled from a deflection yoke coupled to horizontal and vertical deflection amplifiers successively scans horizontally a plurality of vertical, parallel, laterally separated indexing stripes to produce secondary emission current pulses at an indexing recurrence frequency, the actual scanning velocity established by the deflection circuit inherently varying about a nominal fixed value whereby the instantaneous phase of said pulses varies accordingly, the beam intensity being controlled from a grid circuit, a pilot oscillator coupled to said grid circuit to modulate said beam intensity at a fixed pilot frequency whereby an indexing signal constituted by said pulses modulated on a first carrier at said pilot frequency is produced, the upper and lower sidebands of said first carrier respectively representing the sum and difference of said pilot and indexing frequencies, a circuit comprising first means responsive to said indexing signal to derive therefrom a single sideband signal at said indexing frequencies; second means coupled to said deflection yoke to derive therefrom a first voltage, the magnitude of said voltage increasing with increasing difference between said nominal and actual velocities and being zero when said two velocities are equal, said voltage having one polarity when the actual velocity is larger than said nominal velocity and having reversed polarity when the nominal velocity is larger than the actual velocity; third means coupled to said horizontal and vertical amplifiers to derive therefrom second and third voltages respectively proportional to the horizontal and vertical deflection voltages; a control waveform shaper responsive to said first, second and third voltages to derive therefrom a control voltage proportional to the summation of said first, second and third voltages; and a phase shifting and mixing circuit coupled at its input to said source, said first means and said shaper to derive from said video signals, said sideband signal and said control voltage, an output signal constituted by said video signals modulated on a second carrier at said indexing frequency, the phase of said second carrier being shifted in like amount but in opposite direction to said instantaneous phase variations, said phase also being shifted to correct for variations in secondary emission electron transit time and miniscus distortion.

References Cited in the file of this patent

UNITED STATES PATENTS

| | | |
|---|---|---|
| 2,759,042 | Partin | Aug. 14, 1956 |
| 2,862,999 | Fairhurst | Dec. 2, 1958 |